April 28, 1953  L. SCHNEIDER  2,636,771
CORN GLEANER
Filed March 10, 1950
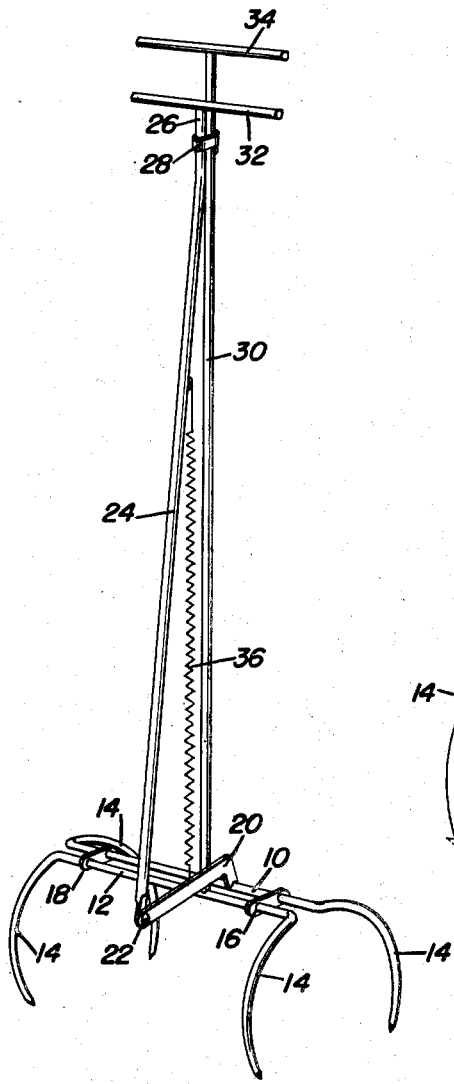
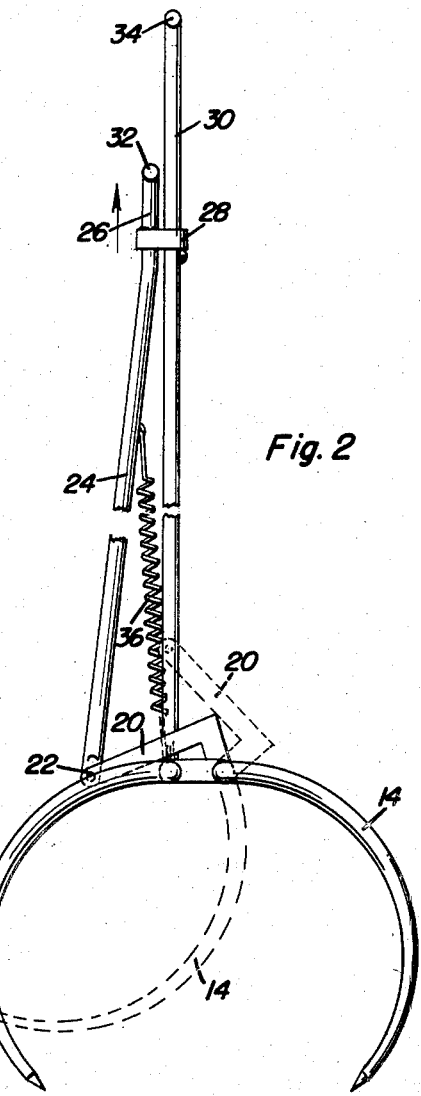
Louis Schneider
INVENTOR.
BY *Clarence A. O'Brien*
and *Harvey B. Jacobson*
Attorneys Patented Apr. 28, 1953

2,636,771

UNITED STATES PATENT OFFICE 2,636,771

CORN GLEANER

Louis Schneider, Kensett, Iowa

Application March 10, 1950, Serial No. 148,839

3 Claims. (Cl. 294—104)

This invention relates to new and useful improvements in lifting and carrying devices and the primary object of the present invention is to provide a pair of complemental gripping members together with manually operated means for forcing the members into clamping engagement with an ear of corn.

Another very important object of the present invention is the provision of a corn gleaner so constructed as to permit the same to be quickly and readily actuated to grip and lift ears of corn that have been pressed into the ground by a farm implement or the like.

A further object of the present invention is to provide a corn gleaner including a pair of complemental gripping members and spring means for yieldingly urging the members apart so that the same can readily release and drop an ear of corn.

A still further aim of the present invention is to provide a corn gleaner that is simple and practical in use, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention; and,

Figure 2 is a side elevational view of Figure 1 and showing in dotted lines the device actuated to grip an ear of corn.

Referring now to the drawings in detail, wherein for the purpose of illustration, there is disclosed a preferred embodiment of the present invention, the numerals 10 and 12 represent first and second elongated members or bars having their ends laterally bent and bowed to provide gripping jaws or arms 14 including lower pointed ends.

A pair of spaced parallel links 16 and 18 are suitably fixed to the member 12 and are apertured to rotatably support the member 10 and to retain the member 10 spaced parallel to the member 12.

The shorter leg of a substantially L-shaped operating lever 20 is rigidly secured to the central portion of the member 10 and extends transversely across the central portion of the member 12. The longer leg of the member 20 is pivoted, by a rivet or pin 22, to the lower end of an inclined actuating bar 24 having an upper straight end portion 26 that is slidably received in a band or loop 28 carried by a handle or rod 30 fixed to the member 12.

Hand grips 32 and 34 are secured to the upper end portion 26 of the bar 24 and the upper end of the rod 30 respectively, with the hand grip 32 underlying the hand grip 34 so that as the hand grip 32 is pulled toward the hand grip 34, the member 10 will rotate to move the arms 14 on the member 10 toward the arms 14 on the member 12, as shown in dotted lines in Figure 2.

An elongated spring member or coil spring 36 is terminally attached to the bar 24 and the member 12 to yieldingly urge the lever 20 against the member 12 and the arms on the member 10 away from the arms on the member 12, so that as the hand grip 32 is released, the member 10 will be rotated to release an ear of corn held by the arms of both the members 10 and 12.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A corn gleaner comprising first and second elongated spaced parallel rod members, gripping arms projecting laterally from the ends of each member, a handle permanently attached to said first member and disposed at right angles to said first member, means carried by said first member rotatably supporting the second member, an operating lever fixed to and held stationary on the second member and overlying the first member, said operating lever being disposed medially the ends of the members and including a free end extending transversely across said first member, an actuating rod slidably carried by the handle and pivoted to the free end of said lever for rotating the second member to move the arms on the second member toward the arms on the first member, and means yieldingly urging the arms on the second member away from the arms on the first member.

2. The combination of claim 1 wherein said last named means includes a coil spring terminally secured to said first member and said rod.

3. A corn gleaner comprising first and second parallel bars, gripping arms projecting laterally from the ends of each bar, a handle permanently attached to said first bar medially the ends of said first bar and disposed at right angles to the first bar, a pair of spaced parallel links rigidly secured at one of their ends to the first bar and having apertures in their free ends rotatably receiving the second bar, a substantially L-shaped operating lever having its shorter leg rigidly secured to the second bar substantially medially the ends of the second bar and its longer leg extending transversely across the first bar alongside of said handle, a loop carried by the handle, an inclined bar having an upper straight end slidably received in said loop, the lower end of said inclined bar being pivoted to the longer leg of said operating lever, and a coil spring terminally secured to said inclined bar and said first bar and yieldingly urging the lever against the first bar and the gripping arms toward each other.

LOUIS SCHNEIDER.

References Cited in the file of this patent

UNITED STATES PATENTS

| Number | Name | Date |
|---|---|---|
| 198,313 | Poole | Dec. 18, 1877 |
| 823,466 | Felton | June 12, 1906 |
| 856,635 | Hazard | June 11, 1907 |
| 1,723,597 | Bannister | Aug. 6, 1929 |

FOREIGN PATENTS

| Number | Country | Date |
|---|---|---|
| 345,435 | France | Nov. 30, 1904 |